United States Patent
Landry et al.

(10) Patent No.: US 8,693,328 B2
(45) Date of Patent: Apr. 8, 2014

(54) METHOD AND APPARATUS FOR DISTRIBUTING CREDITS TO MULTIPLE SHAPERS TO ENABLE SHAPING TRAFFIC TARGETS IN PACKET COMMUNICATION NETWORKS

(75) Inventors: David Christopher Landry, North York (CA); David Cameron Dolson, Waterloo (CA)

(73) Assignee: Sandvine Incorporated ULC, Waterloo, Ontario (CA)

( * ) Notice: Subject to any disclaimer, the term of this patent is extended or adjusted under 35 U.S.C. 154(b) by 461 days.

(21) Appl. No.: 12/388,927

(22) Filed: Feb. 19, 2009

(65) Prior Publication Data

US 2010/0208587 A1 Aug. 19, 2010

(51) Int. Cl.
*H04L 12/56* (2011.01)

(52) U.S. Cl.
USPC ............ 370/230.1; 370/235.1; 370/395.21; 709/203; 709/223; 709/229

(58) Field of Classification Search
USPC ......... 370/395.21, 230.1, 395.41, 235, 260, 370/242, 468, 392, 412, 329, 469, 230, 229, 370/395.4, 235.1; 709/223, 229, 238, 232, 709/226, 203
See application file for complete search history.

(56) References Cited

U.S. PATENT DOCUMENTS

| | | | | |
|---|---|---|---|---|
| 6,052,375 A * | 4/2000 | Bass et al. | ...................... | 370/412 |
| 6,286,052 B1 * | 9/2001 | McCloghrie et al. | ......... | 709/238 |
| 6,400,718 B1 * | 6/2002 | Yamada et al. | ............ | 370/395.3 |
| 6,532,213 B1 * | 3/2003 | Chiussi et al. | ............. | 370/230.1 |
| 6,816,907 B1 * | 11/2004 | Mei et al. | ....................... | 709/229 |
| 6,829,250 B2 * | 12/2004 | Voit et al. | ...................... | 370/467 |
| 6,842,783 B1 * | 1/2005 | Boivie et al. | ................... | 709/225 |
| 6,871,233 B1 * | 3/2005 | Bearden et al. | ............... | 709/226 |
| 6,968,379 B2 * | 11/2005 | Nielsen | ......................... | 709/226 |
| 7,729,250 B2 * | 6/2010 | Matoba | ....................... | 370/230.1 |
| 7,764,615 B2 * | 7/2010 | Gilfix | ........................... | 370/235 |
| 7,768,920 B2 * | 8/2010 | Goshen et al. | ................ | 370/235 |
| 7,808,918 B2 * | 10/2010 | Bugenhagen | ................. | 370/242 |
| 7,826,371 B2 * | 11/2010 | Hirayama et al. | ......... | 370/236.1 |
| 7,830,889 B1 * | 11/2010 | Lemaire et al. | ............ | 370/395.4 |
| 7,983,273 B2 * | 7/2011 | Beshai | ........................ | 370/395.4 |
| 2002/0065907 A1 * | 5/2002 | Cloonan et al. | ............... | 709/223 |
| 2002/0116488 A1 * | 8/2002 | Subramanian et al. | ........ | 709/224 |
| 2003/0035373 A1 * | 2/2003 | Bass et al. | .................. | 370/230.1 |
| 2003/0069972 A1 * | 4/2003 | Yoshimura et al. | ........... | 709/226 |
| 2003/0191853 A1 * | 10/2003 | Ono | ............................. | 709/232 |
| 2003/0214948 A1 * | 11/2003 | Jin et al. | ........................ | 370/392 |

(Continued)

OTHER PUBLICATIONS

V. P. Kumar, T. V. Lakshman, D. Stiliadis, "Beyond Best Effort: Router Architectures for Tomorrow's Internet", IEEE Communications Magazine, May 1998, pp. 152-164.

(Continued)

*Primary Examiner* — Michael Thier
*Assistant Examiner* — Vincelas Louis
(74) *Attorney, Agent, or Firm* — Borden Ladner Gervais LLP; Neil Henderson

(57) ABSTRACT

A computer based system and method for distributing a global shaper rate implemented across multiple traffic processing devices. A controller distributes credits according to the demand (amount of traffic, or offered load) of each device, in such a way to achieve global targets, including the shaper rate, strict prioritization of traffic, WFQ weights and fairness between cloned channels, iteratively updated as changes occur in the quantity and makeup of the traffic across the devices.

18 Claims, 16 Drawing Sheets

(56) References Cited

U.S. PATENT DOCUMENTS

| | | | |
|---|---|---|---|
| 2004/0196788 A1* | 10/2004 | Lodha | 370/230 |
| 2004/0228291 A1* | 11/2004 | Huslak et al. | 370/260 |
| 2005/0160178 A1* | 7/2005 | Venables | 709/233 |
| 2005/0278456 A1* | 12/2005 | Hassan | 709/235 |
| 2006/0007854 A1* | 1/2006 | Yu | 370/229 |
| 2006/0088032 A1* | 4/2006 | Venables | 370/395.4 |
| 2006/0174023 A1* | 8/2006 | Horn et al. | 709/231 |
| 2006/0280119 A1* | 12/2006 | Karamanolis et al. | 370/229 |
| 2007/0081554 A1* | 4/2007 | Saffre | 370/468 |
| 2007/0153697 A1* | 7/2007 | Kwan et al. | 370/235 |
| 2008/0259852 A1* | 10/2008 | Massiera et al. | 370/329 |
| 2009/0010264 A1* | 1/2009 | Zhang | 370/395.21 |
| 2010/0220595 A1* | 9/2010 | Petersen | 370/235 |
| 2010/0296520 A1* | 11/2010 | Matthews et al. | 370/468 |

OTHER PUBLICATIONS

J. Bennett and H. Zhang, "Worst-case fair packet fair queueing algorithms", Technical report, 1996.

J. Bennett and H. Zhang, "Hierarchical Packet Fair Queueing Algorithms", ACM SIGCOMM Computer Communication Review, Oct. 1996, pp. 143-156, vol. 26 issue 4.

G. Armitage, "Quality of Service in IP Networks: Foundations for a Multi-Service Internet", Apr. 2000, pp. 63-104, MTP Indianapolis, IN, USA.

Canadian Intellectual Property Office, Office Action dated Dec. 22, 2010, Canadian patent application No. 2,655,033, Quebec Canada.

Canadian Patent Office, Canadian Office Action, CA Application No. 2,655,033, Dated May 28, 2012.

* cited by examiner

| Instance ID | Current Rate | Demand Metric | No. Priorities | } 120 |
|---|---|---|---|---|
| 1 (bronze) | 500Mbps | 2400Mbps | 2 | |

120a / 120b / 120c / 120d

| Priority ID | Curr. Max Rate | Demand Metric | No. Channels | } 122 |
|---|---|---|---|---|
| 0 (high) | infinity | 1000Mbps | 2 | |

122a / 122b / 122c / 122d

| Channel ID | Current Weight | Demand Metric | Offered Load | } 124 |
|---|---|---|---|---|
| 0 (voip) | 5 | 250 (subscribers) | 800Mbps | |

124a / 124b / 124c / 124d

| Channel ID | Current Weight | Demand Metric | Offered Load | } 124 |
|---|---|---|---|---|
| 1 (games) | 1 | 400 (subscribers) | 200Mbps | |

124a / 124b / 124c / 124d

| Priority ID | Curr. Max Rate | Demand Metric | No. Channels | } 122 |
|---|---|---|---|---|
| 1 (low) | infinity | 1400Mbps | 2 | |

122a / 122b / 122c / 122d

| Channel ID | Current Weight | Demand Metric | Offered Load | } 124 |
|---|---|---|---|---|
| 0 (web) | 3 | 1200 (subscribers) | 700Mbps | |

124a / 124b / 124c / 124d

| Channel ID | Current Weight | Demand Metric | Offered Load | } 124 |
|---|---|---|---|---|
| 1 (p2p) | 2 | 500 (subscribers) | 700Mbps | |

METHOD AND APPARATUS FOR DISTRIBUTING CREDITS TO MULTIPLE SHAPERS TO ENABLE SHAPING TRAFFIC TARGETS IN PACKET COMMUNICATION NETWORKS

FIELD

The present application relates to the computer field of "traffic shaping". Traffic shaping is used to manage the bandwidth on a communications network to meet performance goals. Traffic shaping is a process of optimizing traffic by examining attributes of packets and delaying or dropping certain packets in order to achieve goals such as: attaining specific bitrates, attaining specific ratios between different types of traffic, providing fair sharing of bandwidth or smoothing bursts of traffic.

BACKGROUND

Traffic shaping deals with datagram traffic (a stream of datagram packets) from one or many source computers to one or many destination computers. A traffic shaper lies between the source and the destination of each packet of the traffic. The traffic is prioritized by the shaper, and based on this, a decision is made for each packet whether it is delivered to the destination or not, as well as when it is delivered.

In a typical solution, a traffic shaping deployment may include multiple traffic processing devices, each shaping a portion of the traffic. The quantity or makeup of traffic going to each device may not be the same, which means that simply dividing the desired values by the number of devices and allowing each device to shape the traffic independent of the others will not be sufficient to achieve the performance goals.

Deriving the solution for the correct rates and parameters to achieve performance goals is non-trivial. This cannot generally be done manually as the quantity and makeup of traffic in each traffic processing device is constantly changing. As such, there is a need for an improved method, system and apparatus for managing a shaper or shapers.

SUMMARY

Embodiments herein are intended to address the need for achieving traffic shaping performance goals by coordinating shaping behavior on multiple traffic processing devices using iterative re-evaluation and updating of the parameters applied to shapers on each traffic processing device.

According to one aspect herein, there is provided a computer based system and method for distributing a global shaper rate implemented across multiple traffic processing devices. In particular, a controller distributes credits according to the demand (amount of traffic, or offered load) of each traffic processing device, in such a way to achieve global targets, including the shaper rate, strict prioritization of traffic, WFQ weights and fairness between cloned channels, iteratively updated as changes occur in the quantity and makeup of the traffic across the devices.

In an aspect of embodiments herein, there is provided a system for monitoring and modifying the behavior of a plurality of shapers, the system including: a server, residing on a controller; and a plurality of clients in communication with the server, each of the clients residing on one or more traffic processing devices and the clients configured to monitor datagram traffic, wherein the server is configured to receive statistics related to the datagram traffic from the clients and to retain the same; and the server is configured to utilize the statistics to send commands to the clients to modify the behavior of the shapers.

In a particular case, the commands may instruct the clients to provide a new maximum rate for a priority related to at least one of the shapers.

In another particular case, the commands may instruct the clients to provide a new weight for a channel related to at least one of the shapers.

In yet another particular case, the commands may instruct the clients to assign a total rate to each of the multiple shapers.

In another aspect, there is provided a method for monitoring and modifying the behavior of a plurality of shapers, the method including: for each shaper: and for each priority of the shaper: a) determining a demand sum for an instance and priority; b) determining a weight sum for the priority; c) determining a rate for the priority; and d) determining a channel weight for the priority, wherein the determining utilizes data provided by a statistics record related to the shaper; and generating a command record for delivery to each shaper to modify the behavior of the shapers. In particular, the command record may be a message containing new parameters for the shaper in order to make the shaper more efficient based on current operating conditions.

In a particular case, the demand sum comprises the sum of demand across all clients for a shaper.

In another particular case, the weight sum comprises the sum of the weights of all channels in a given priority.

In yet another particular case, the rate for a priority comprises an allocated rate for an instance priority pair, divided by a demand ratio.

BRIEF DESCRIPTION OF THE DRAWINGS

Embodiments will now be described, by way of example only, with reference to the attached Figures, wherein:

FIGS. 5A and 5B are block diagrams of an example of a series of variable length statistics data records;

DETAILED DESCRIPTION

A user creates a "policy definition" which defines a shaper. A policy definition is the template information for a shaper. A shaper has one or more priorities, each priority having one or more channels. Each shaper may have a unique-by variable associated with it, which defines the shaper instances. Each priority may have a shared-by variable associated with it which defines the channel instances.

A number of schemes may be utilized in shaping traffic to meet performance goals. Schemes may be combined and typically utilize "credits" (which represent a binary "bit" of traffic) to determine when a packet may be sent. In every case, credits are created at a constant rate, and if and only if a "channel" has enough credits, a packet is sent. Examples of schemes for allocating credits follow:

1) Cloned shaping or "unique-by" shaping. This scheme involves dynamically making a clone of a shaper on demand, for each unique value of an input variable. For example, creating a shaper for each different service tier level of the subscribers as the different levels are in use, creating a shaper for each IP address, or creating a shaper for each of some shared network resource such as a physical link or transmission frequency. Each cloned shaper, called a "shaper instance", shapes its traffic to the configured shaper rate.
2) Traffic can also be strictly prioritized, wherein credits are first given to the highest priority, and then the unused credits of a priority are made available to the next highest priority.
3) Weighted Fair Queuing (WFQ). In contrast to strict prioritization, a client allocates credits to each channel proportional to the weight of the channel. For example, a channel of weight 2 receives twice as many credits (and consequently, sends twice as many bits of traffic) as a channel of weight 1. Unused credits of one channel may be used by other channels.
4) Fair shaping, or "shared-by" shaping, involves making a clone of a channel for each unique value of an input variable. For example, a channel could be cloned for every unique sender IP-address. A traffic processing device then divides the credits equally among the cloned channels, called "channel instances", thus giving each a fair share of the traffic. This is fundamentally the same as WFQ, save that channels are dynamically added and removed and each channel has equal weight.

Figure 1A:
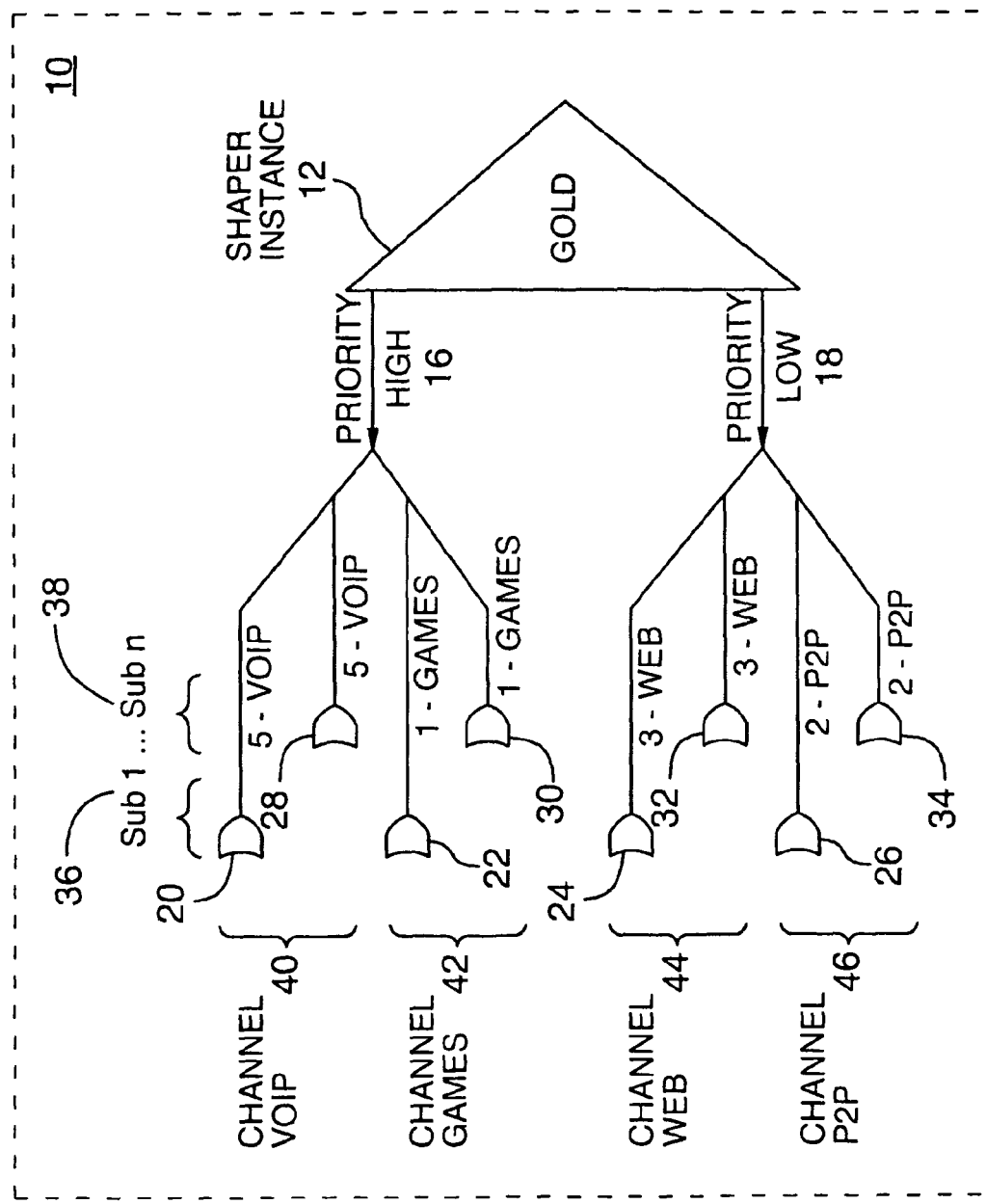
FIGS. 1A and 1B are block diagrams of shaper instances, each cloned from the same shaper.
Figure 1B:
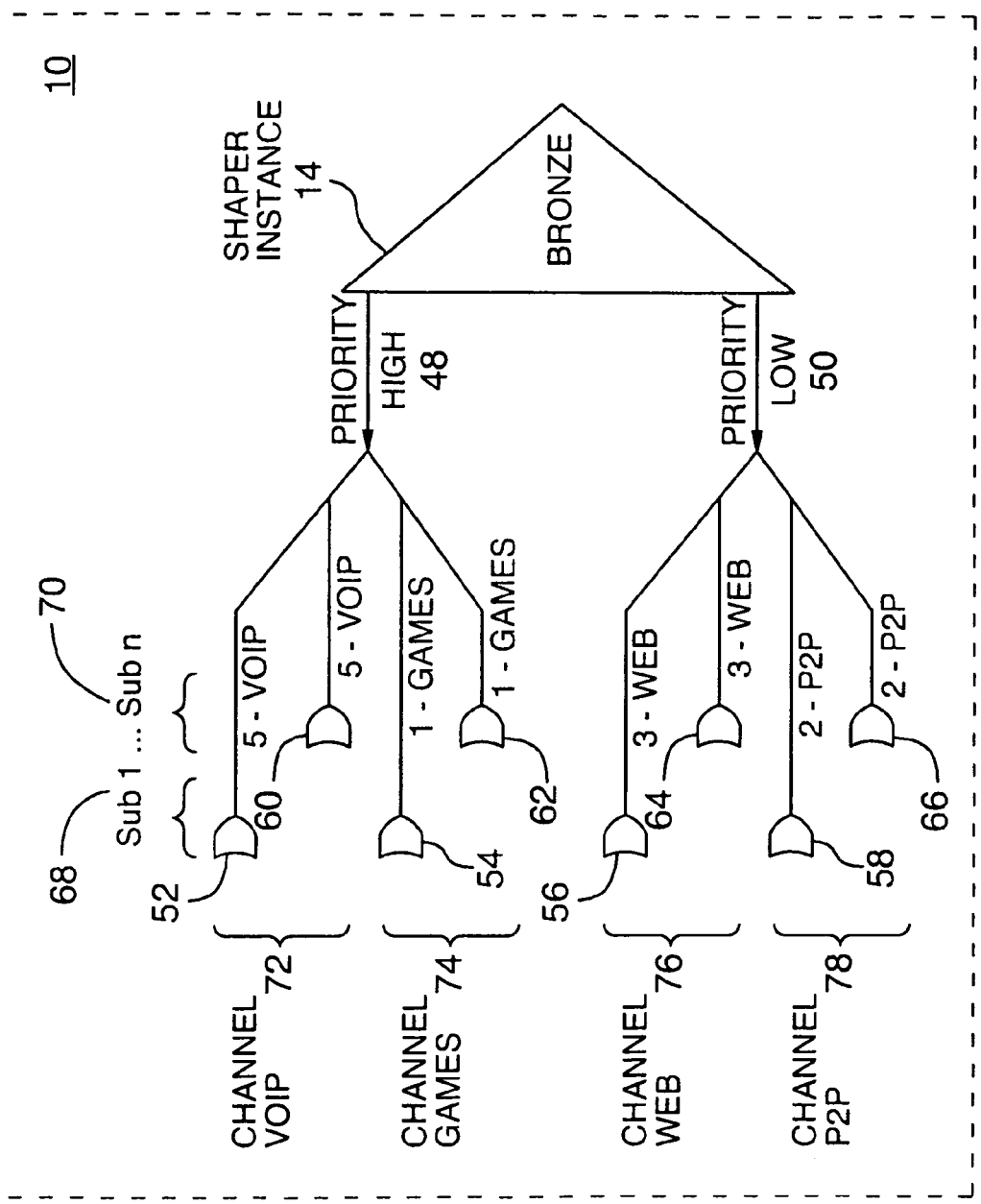

An example policy definition for creating a shaper comprising two shaper instances as shown in FIGS. 1A and 1B is attached as Appendix "A".

With reference to FIGS. 1A and 1B, credits move from right to left. Datagram traffic is sent via a channel instance such as feature 20.

As discussed earlier, a shaper 10 may have many instances such as gold 12 or bronze 14. FIGS. 1A and 1B when combined define a shaper 10. Each instance is cloned based on a unique-by variable such as service tier configurable by the user. At each time interval, a shaper instance (12, 14) creates credits. The number of credits created is determined by the rate the shaper instance is configured to attain. The credits are passed to a priority (16, 18, 48, 50). Here we show two shaper instances, each representing a service tier. Instance 12 is a gold level shaper instance, meaning it shapes traffic for subscribers in the gold service tier. In contrast shaper instance 14 is a bronze level shaper instance, and as such shapes traffic for subscribers in the bronze service tier. Both instances 12 and 14 independently shape at a configured rate, which may be the same rate. As can be seen from FIG. 1B the features are identical to that of FIG. 1A save that they are associated with a different shaper instance.

The features 36 and 38 refer to subscribers, each being assigned as a value of the shared-by variable. A subscriber may be a single IP address or multiple IP addresses belonging to the same customer. Each subscriber may have multiple channel instances, typically one for each channel. By way of example, Sub 1 (36) of FIG. 1A has channel instances 20, 22, 24 and 26.

Within a shaper instance, there may be a plurality of priorities, the exact meaning of each is configurable by the user. In the example of FIG. 1A, priority level 16 is rated as "high", while priority level 18 is rated as "low". In this case, this means "low" will only receive credits that "high" does not use. The priorities (16, 18) in turn take their credits and give them to the channel instances, for example (20-34) under them.

Each channel is assigned a weight, configurable by the user, and each channel instance cloned from that channel is given that weight. For example, channel instances (sub1 20, sub n 28) are clones of the channel for VOIP 40, of weight five. Channel instances (sub1 24, sub n 32) are instances of a channel 44 for web traffic, of weight three. These channels are shown by way of example. Many different channels may be added with weights for specific traffic. Different weighted channels are made for different protocols in this case, but not necessarily always. Some configurations, for example, may provision different weighted channels for different classes of customers. For example, a deluxe level of service of weight ten, a normal level of service, of weight five, and an economy level of service, of weight two.

A channel may have multiple instances, typically one for each unique value of the shared-by variable. This is shown as features Sub 1 (36) to Sub n (38). For example, a channel VOIP 40 is cloned for Sub 1 (36) to create channel instance 20. The same channel is cloned for Sub n (38) to make channel instance 28. Note that the number of channel instances is determined by the shared-by variable, and may not be the same for different shaper instances of the same shaper. The channel instances receive datagram packets and determine if packets are delivered, delayed or dropped according to available credits.

Figure 2:
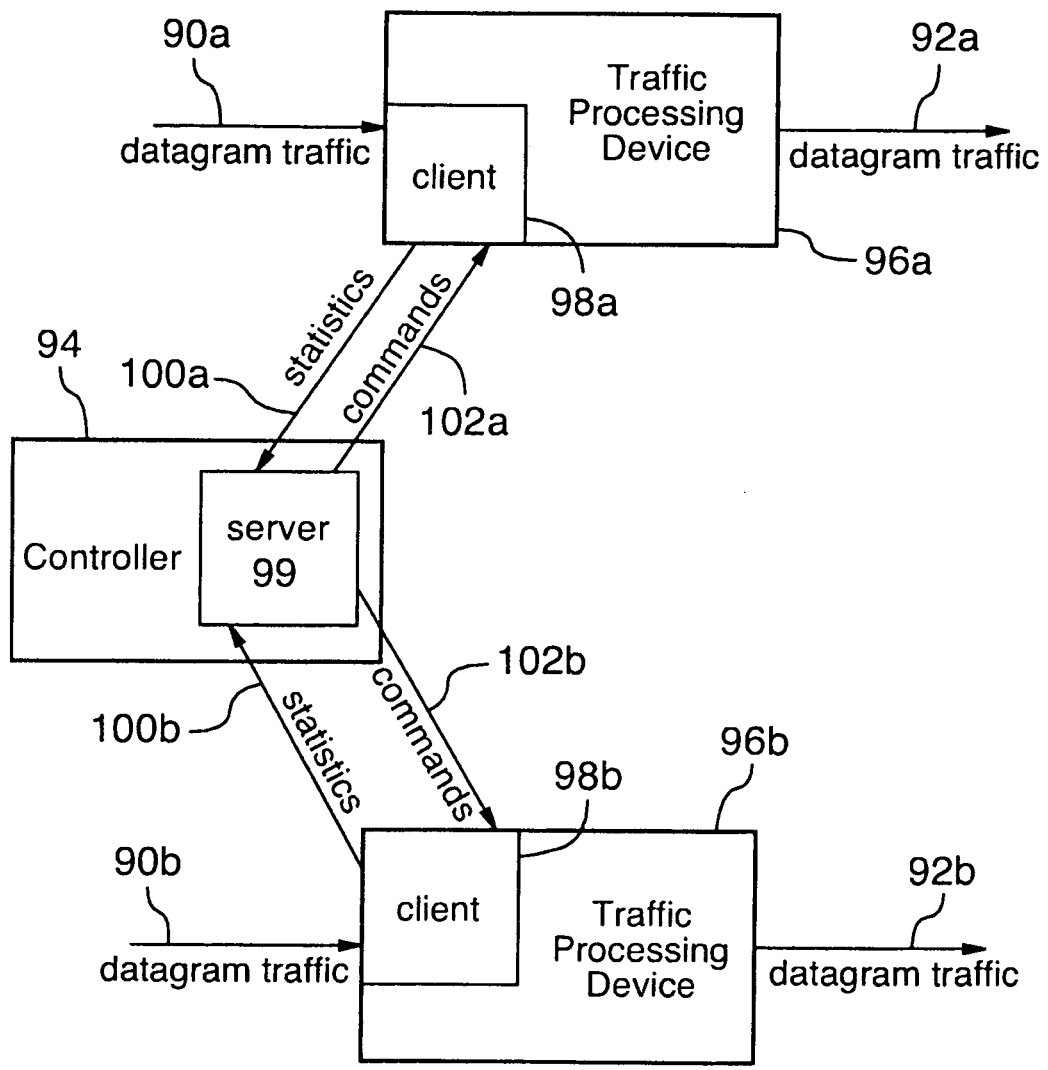
FIG. 2 is a block diagram of an embodiment herein.

Referring now to FIG. 2 a block diagram of an embodiment of a system herein is shown.

An implementation consists of four types of modules, based upon a client-server model. As one skilled in the art will appreciate the function of each module may be distributed or combined between modules. By way of example we describe an implementation of a basic system.

The modules of FIG. 2 comprise: controller 94, traffic processing devices 96a, 96b), clients (98a, 98b) and server 99. Clients (98a, 98b) residing on the traffic processing devices (96a, 96b) communicate with server 99, residing on controller 94.

Server 99 receives statistics (100a, 100b) and transmits commands (102a, 102b) to clients (98a, 98b). Each traffic processing device (96a, 96b) receives datagram packets (90a, 90b). Depending on the configuration, a packet may be passed to a channel instance inside a shaper, and depending upon available credits, it may be dropped, delivered or queued for future delivery. The delivery of packets is shown by features 92a and 92b.

Traffic processing devices (96a, 96b) are typically computing devices upon which a software client (98a, 98b) may reside as a separate computing thread. In one embodiment there may be one or more clients each handling a subset of the traffic going to a traffic processing device. Controller 94 is typically a computing device upon which a software server 99 may reside as a separate computing thread. It will be understood that the traffic processing devices, controller, server and clients may be embodied in hardware or software. In some cases, these elements may be co-located while in others they may be distributed both physically and logically. Where implemented as software, these elements may be provided as physical computer-readable media containing computer-readable instructions, which, when executed on a computing device, which may be a dedicated device, cause the device to perform the functions of the respective feature.

A client (98a, 98b) runs parallel to its traffic processing device (96a, 96b), and serves at least two purposes:

1) to collect detailed statistics about the datagram traffic (90a, 90b) passing through a traffic processing device (96a, 96b) and to send those statistics (100a, 100b) to server 99; and 2) to accept commands (102a, 102b) from the server 99 and inform a traffic processing device (96a, 96b) to adjust the parameters of a shaper instance such as feature 12 of FIG. 1A (for example, the rate for the shaper instance 12, or the modification of the weights of all channel instances cloned from channel 40).

Figure 3:
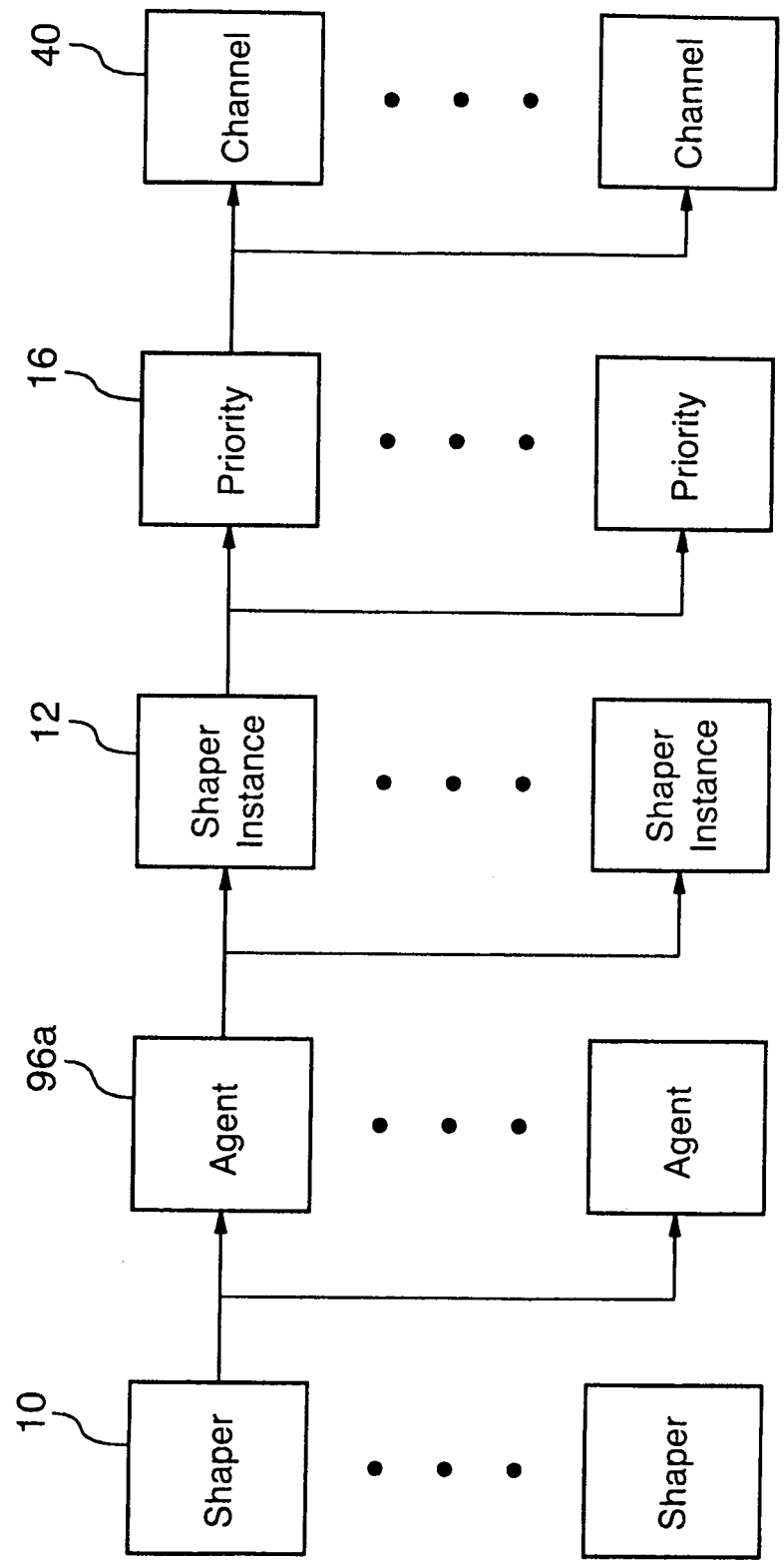
FIG. 3 is a block diagram of the hierarchical data utilized by a controller to identify the components associated with a system of shapers.

Referring now to FIG. 3, a block diagram of the hierarchical data utilized by a controller to identify the components associated with a system of shapers is shown. We also refer the reader to FIGS. 1A and 1B which illustrate instances of shapers.

A shaper 10 is defined by a policy as discussed above with reference to Appendix "A". A shaper 10 may be utilized by a plurality of traffic processing devices such as 96a and 96b (see FIG. 2). For each shaper 10, a traffic processing device (96a, 96b) has a plurality of shaper instances, such as 12, according to the unique-by values. Each shaper instance (12, 14) has a plurality of priorities such as 16. Associated with each priority may be one or more channels, such as 40. Channels in turn may have one or more channel instances, according to the shared-by values, as shown for example as features 20 and 28 of FIG. 1A.

Figure 4:
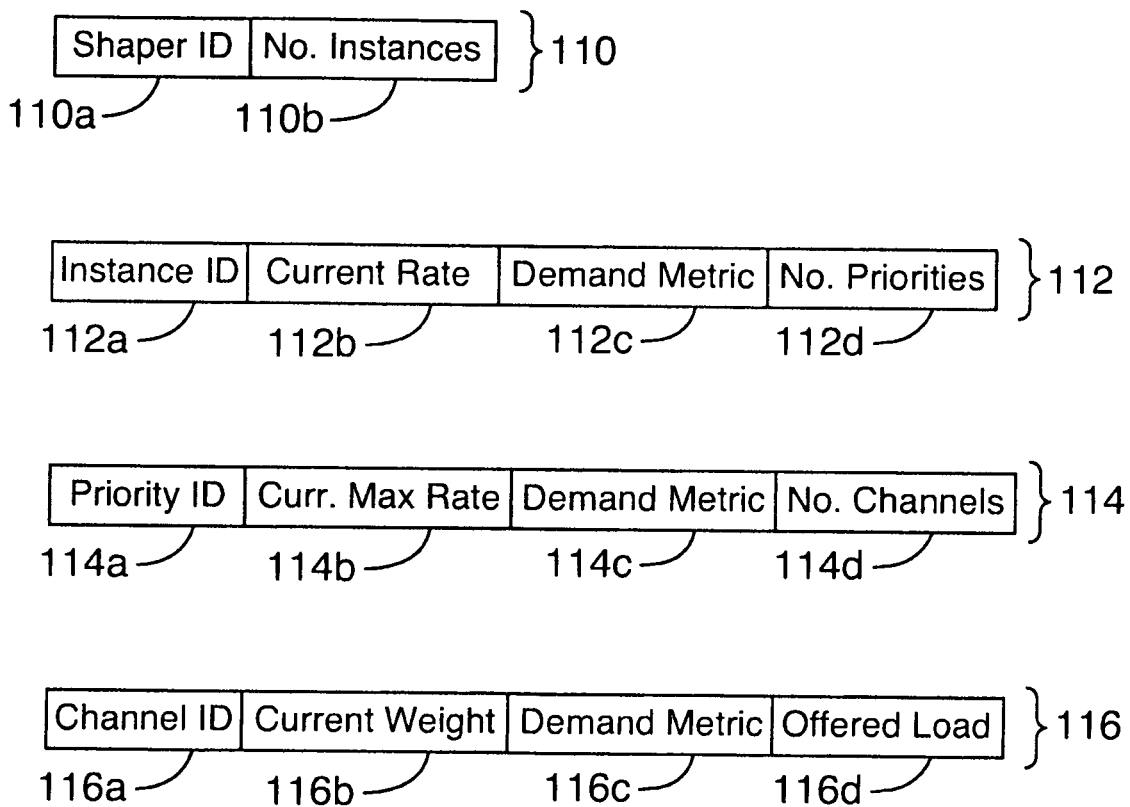
FIG. 4 is a block diagram of a variable length statistics data record.

Referring now to FIG. 4 a block diagram of a variable length statistics data record is shown. A statistics record is shown as features 100a and 100b of FIG. 2. There are four types of sections in each statistics record. They are sections 110, 112, 114, 116.

The first field of each section is a unique identifier for that section, e.g. each shaper definition is given a shaper ID 110a. Each shaper instance is given an Instance ID 112a. Each priority is given a Priority ID 114a. Each channel is given a Channel ID 116a. The last field (110b, 112d and 114d) of each section, excluding the field 116d, indicate how many instances of the following sub-section are present for that record, e.g. the field 112d indicates the number of priorities present in this statistics record for the shaper instance. The field 116d indicates a maximum bandwidth or load a channel is requesting.

Current rate 112b is the current value for the rate of a shaper instance. Current Max Rate 114b is the current value for the maximum rate of a priority. Current weight 116b is the current value for the weight of a channel. Current weight 116b is stored in all the channel instances for a channel. Each channel instance for a channel generally has the same weight, so the current weight 116b is the weight for a channel, representing all of its channel instances. In other words, statistics are generally sent for a channel, not individual instances.

Demand metrics 112c, 114c and 116c indicate how much datagram traffic is being handled. For example, a doubling of traffic would effect a doubling of the demand. This can be expressed in various metrics, one being an input bit rate.

Figure 5A:
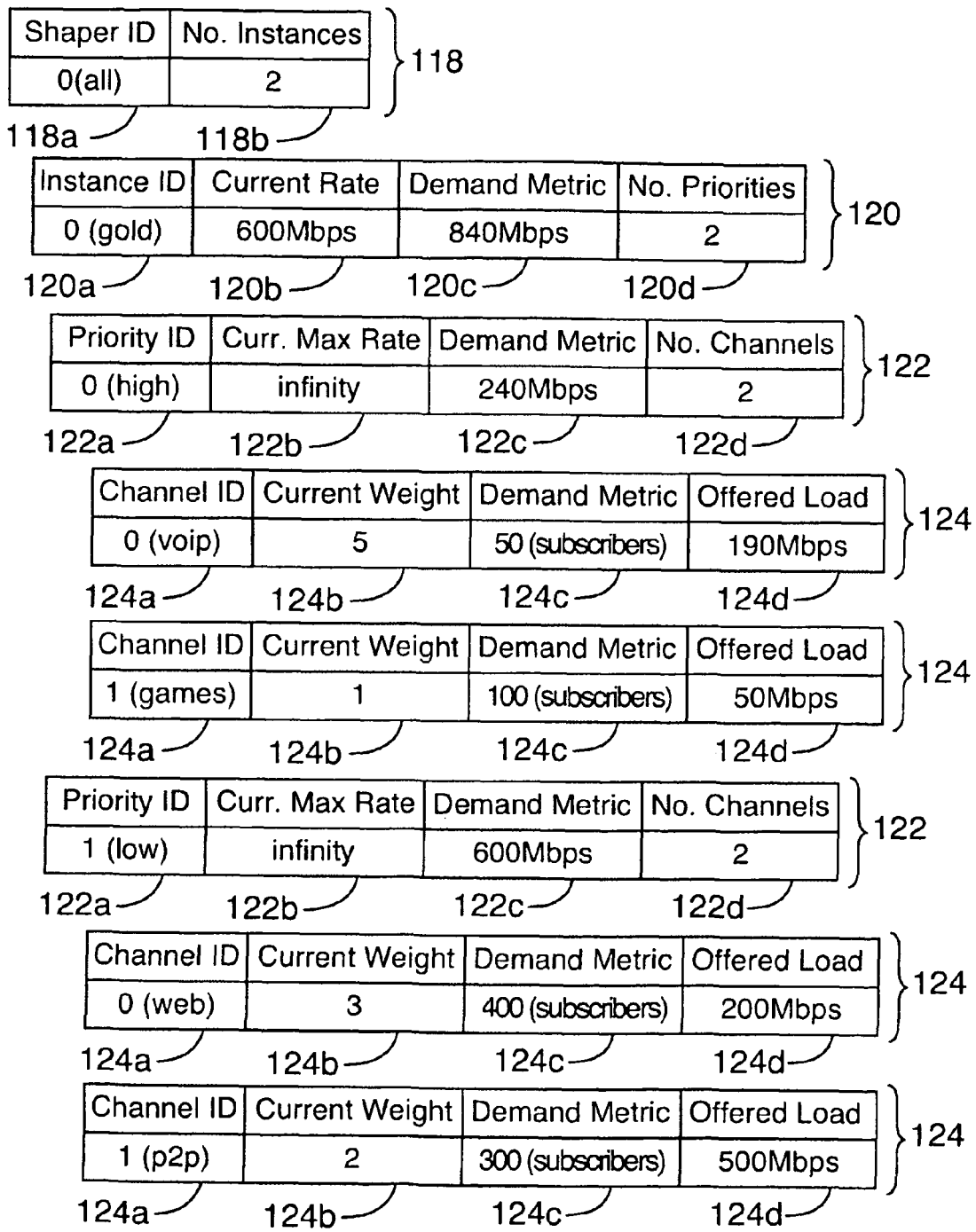

Referring now to FIGS. 5a and 5b block diagrams of an example of a series of variable length statistics data records is shown.

Section 118 indicates there are two instances of a shaper having a Shaper ID of "0". Each section 120 describes one of these two instances. Each section 120 includes a current rate 120b, and a demand metric 120c. Current Rate 120b is the rate for a shaper instance (shown here in Mbps). The demand metric 120c is the bits per second requested by the instance and in this example is the sum of the two demand metric fields 122c of priorities 122 associated with instance 120, Each instance may have multiple priorities 122. Each priority section 122 includes a current max rate 122b and a demand metric 122c. Current max rate 122b in this example is set to infinity. Demand metric 122c is the bits per second requested by the priority.

Each priority may have multiple channel sections 124. Each channel section 124 includes a current weight 124b, which is the current weight of all the channel instances for the specified channel. This is initially the target weight defined for the channel. For example in FIG. 1A channel 40 has two VOIP instances both having the same weight of five. Demand metric 124c may be the number of bits requested by a channel, unless the shaper is "shared-by", in which case the demand metric 124c is the number of channel instances. In this example, a channel instance is created for a subscriber, so the number of channel instances for a channel equals the number of subscribers. Offered load 124d is the number of bits per second requested by the channel.

Figure 6:
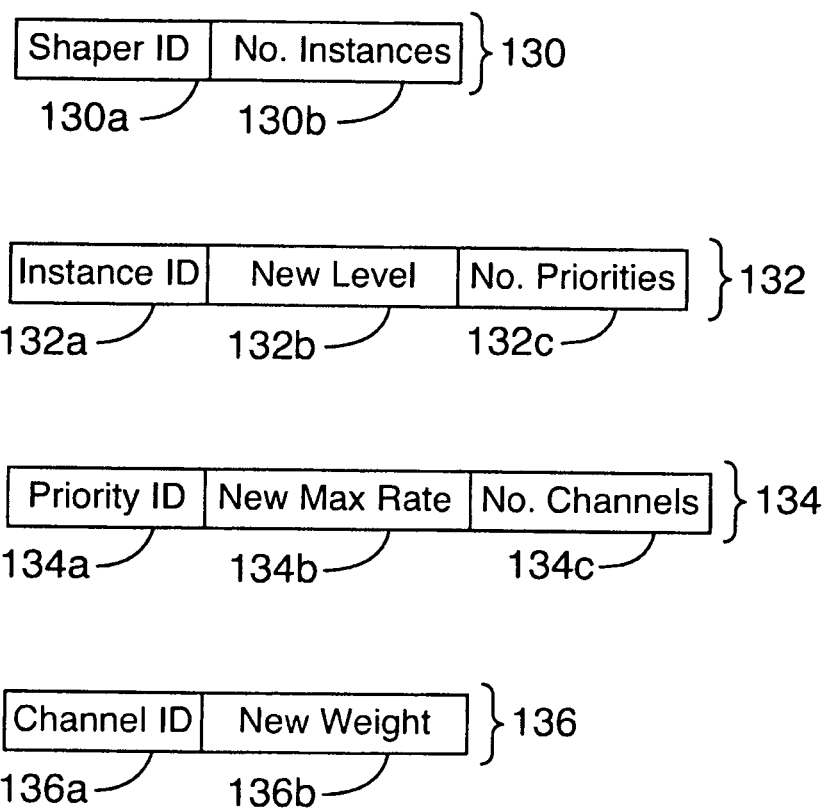
FIG. 6 is a block diagram of a variable length command data record.

Referring now to FIG. 6 a block diagram of a variable length command data record is shown.

The structure of FIG. 6 indicates the format of command messages (102a, 102b) sent by server 99 to clients (98a, 98b), as shown in FIG. 2. Each command message comprises a section 130 which identifies a shaper ID 130a and the number of instances 130b of that shaper ID.

For each shaper instance of a shaper with ID 130a, a section 132 exists. Section 132 comprises an instance ID 132a to identify the shaper instance. New level setting 132b represents the new rate for the shaper instance. Number of priorities 132c indicates the number of priorities for a shaper instance, each priority having a section 134. Section 134 comprises a field 134a which identifies the priority. Field 134b indicates a new maximum rate for the priority. Field 134c indicates the number of channels associated with priority ID 134a. Finally, section 136 exists for each channel ID 136a and provides a new weight 136b.

Figure 7A:
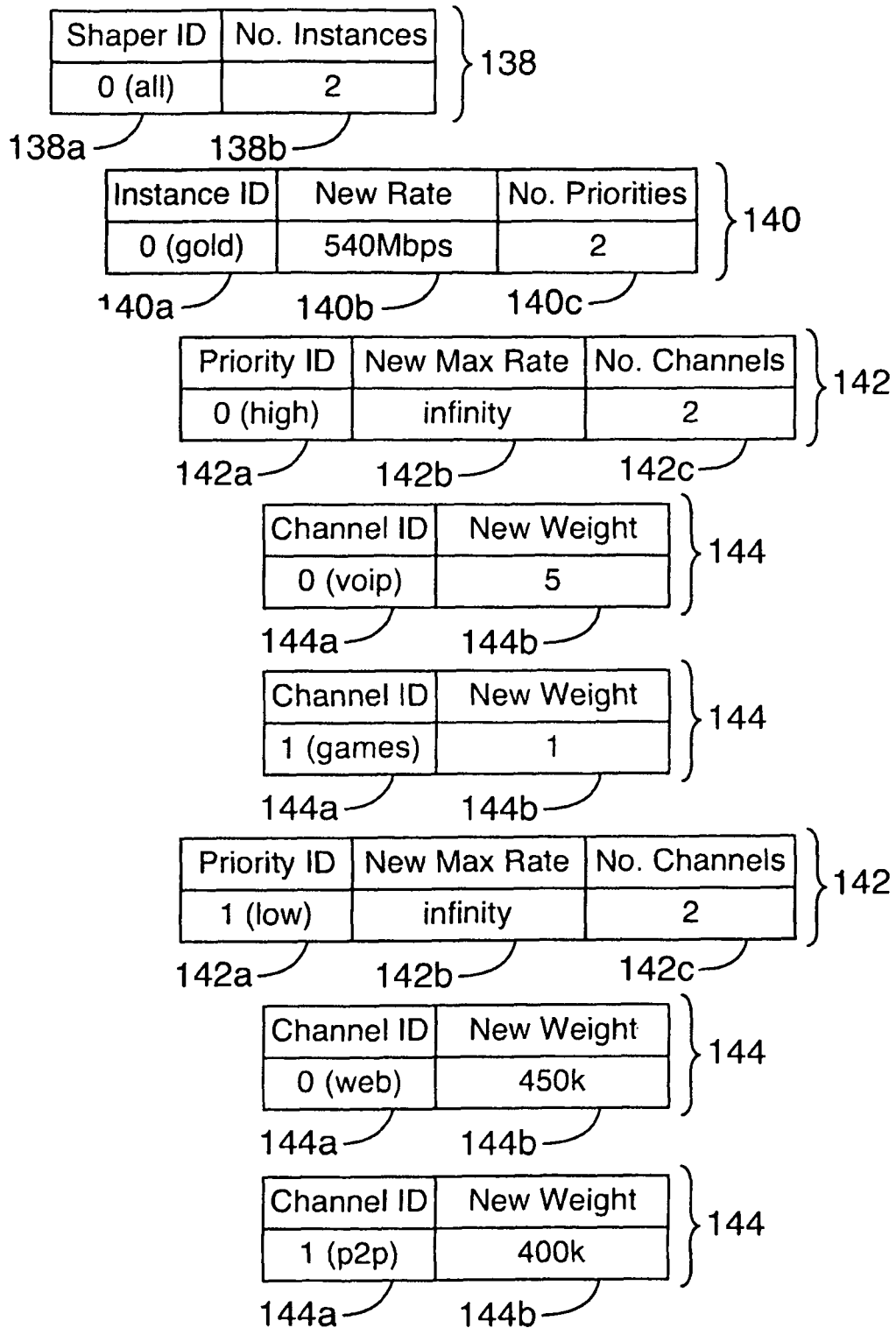
FIGS. 7A and 7B are block diagrams of an example of a series of variable length command data records.
Figure 7B:
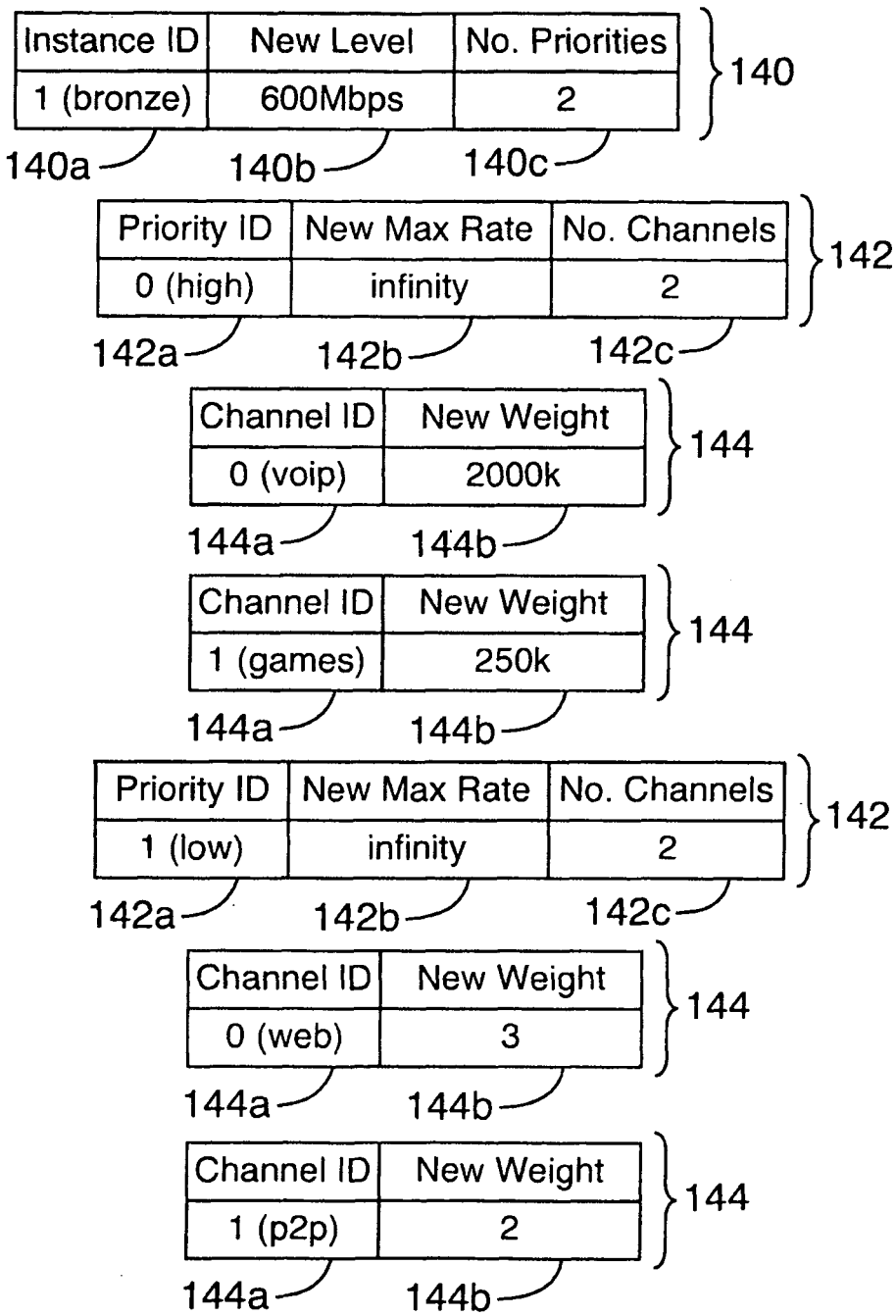

Referring now to FIGS. 7A and 7B, block diagrams of an example of a series of variable length command data records is shown.

Section 138 indicates there are two instances of a shaper having a Shaper ID of "0". Each section 140 describes a shaper instance of the shaper. An instance section 140 includes a new rate value 140b which defines what the new rate for the shaper instance should be set to. Each instance section 140 may have multiple priority sections as shown by sections 142. Each priority section 142 includes a new maximum rate 142b to be set for the priority.

Each priority may have multiple channels. Each channel section 144 includes a new weight in field 144b for the channel. The values shown in field 144b may be large numbers (where 1000s are denoted with the symbol 'k') or small numbers. In this embodiment, since the absolute values of the weights are insignificant, and only the ratios are significant, a weighting of 250 k to 400 k is the same as a weighting of 25 to 40 (which could be further simplified to 5 to 8).

As statistics (100a, 100b) arrive to the server (99), they are stored in a data structure, which is used for the calculation of commands (102a, 102b). One embodiment of such a data structure follows. Data type details have been omitted (e.g. int32/int64, signedness, rounding errors).

Data Structure 1

```
struct channel {
    int weight;
    int demand;
    int load;
};
struct priority {
    int max_rate;
    int demand;
    channel channels[num_channels];
};
struct instance {
    int rate;
    int demand;
    priority priorities[num_priorities];
};
struct client {
    instance instances[num_instances];
};
struct shaper {
    client clients[num_clients];
};
shaper shapers[num_shapers];
```

The statistic values and those stored in the data structure are generally the same. These values are manipulated by the server 99, to generate command values. The following Table 1 illustrates an example correlation of the various values.

TABLE 1

Correlation of Values

| Statistics | Data Structure | Command Value |
|---|---|---|
| Current rate | instance.rate | New level |
| Current max rate | priority.max_rate | New max rate |
| Current weight | channel.weight | New weight |
| Offered load | channel.load | |
| Demand metric | X.demand | |
| Number of X | X.num_X | |

In the above Table 1, the value X can be substituted for one of: instance, priority or channel. For example "Number of Channels" would be "channel.num_channels".

The keys to the arrays of each structure are generally the various IDs: Channel ID, Priority ID, Instance ID, Client ID, and Shaper ID.

Referring now to FIGS. 8 to 13, flowcharts of methods used to analyze statistics and generate commands are shown.

The methods illustrated in FIGS. 8 to 13 cycle through the features of FIG. 3, such as shapers 10, traffic processing devices 96*a* (sometimes referred to as an "agent"), shaper instances 12, priorities 16 and channels 40.

To aid the reader in better understanding the flowcharts of FIGS. 8 to 13 following table describes the variables used.

TABLE 2

Variable Name Definitions

| Name | Definition |
|---|---|
| allocated_rate[i][p] | The amount of bandwidth assigned to a client per shaper instance and priority. (i = instance, p = priority) |
| bw_remaining | The bandwidth remaining to be allocated to a set of channels. |
| channel.load | The offered load in the statistics record (116d) |
| channel.weight | The current weight from the statistics record (116b), initially the weight defined in the policy for this channel. |
| demand_ratio | priority.demand/demand_sum[i][p] |
| demand_sum[i][p] | Sum of demand across all clients for a shaper instance, priority pair (i = instance, p = priority). |
| new_channel.new_level | The new weight in the command record (136b) |
| new_instance.new_level | The new level in the command record (132b) |
| new_level | The portion of the bandwidth remaining which is to be assigned to the current channel in this iteration. |
| new_priority.new_level | The maximum rate in the command message (104.b) |
| priority.demand | The demand metric for the current priority from a statistic record (114c) |
| priority.max_rate | The maximum rate from a statistics message (114b), initially the max_rate defined in the policy for this priority. |
| priority_rate | allocated_rate[i][p] * demand_ratio |
| remaining[i] | The amount of remaining (unallocated) credits for an instance, (i = instance). As credits are allocated to a priority, this value is reduced accordingly. |
| shaper.rate | The rate defined in a policy for this shaper, i.e. the desired target rate across the system. |
| weight_sum[p] | The sum of the weights on the channels in the given priority (p = priority) |

Figure 8:
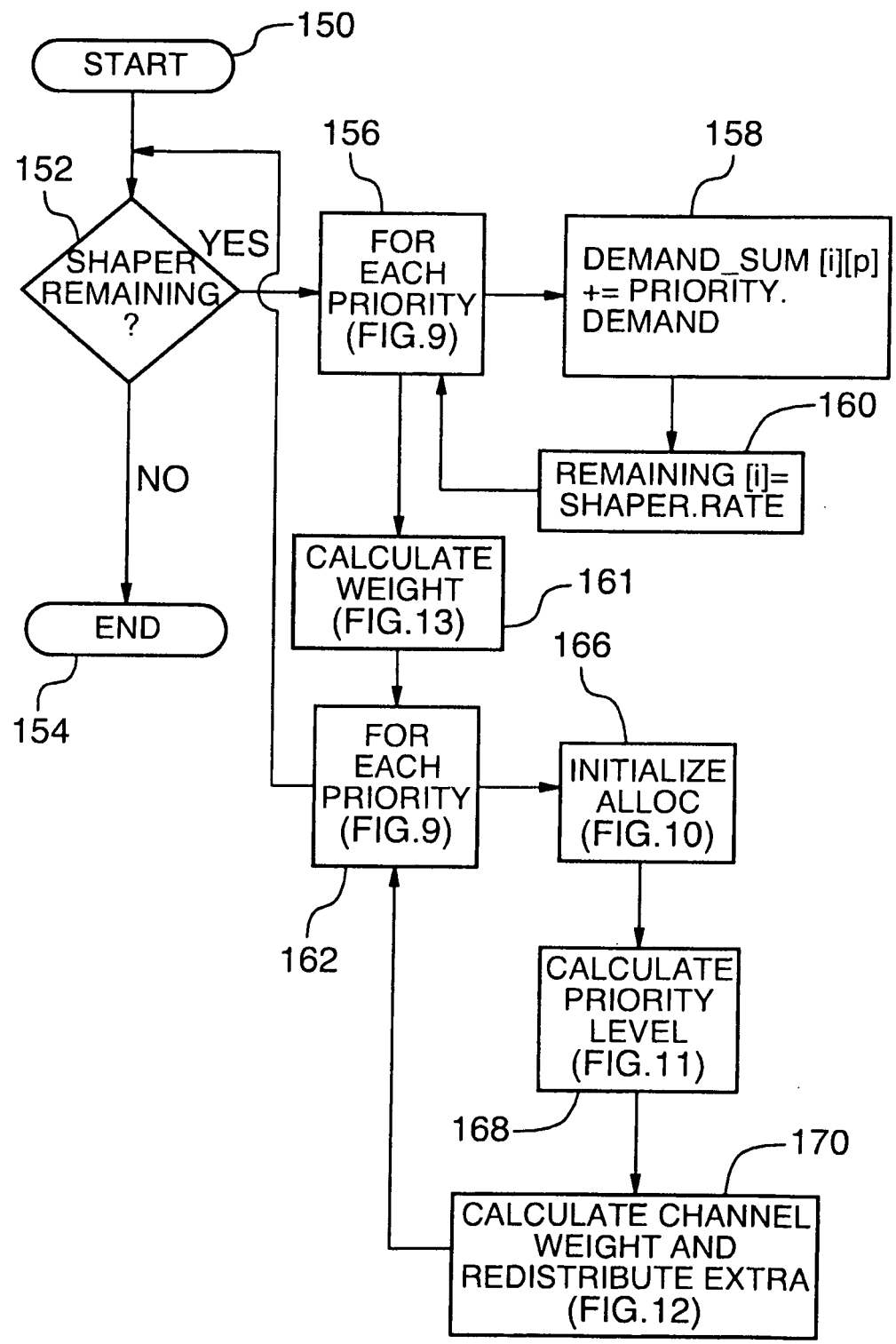
FIGS. 8 to 13 are flowcharts of methods used to analyze statistics and generate commands.

Referring first to FIG. 8 processing begins at step 150. The process beginning at step 150, is initiated by server 99 in which the process resides.

At step 152 a test is made to determine if all shapers have been examined. If there are no more shapers to examine, processing moves to step 154 and ends. If there are still shapers to examine the process moves to step 156. The process of step 156 is detailed in FIG. 9. At step 156 instances and priorities are examined so that the value of demand_sum [i][p] may be set for each shaper instance, priority pair at step 158.

Figure 13:
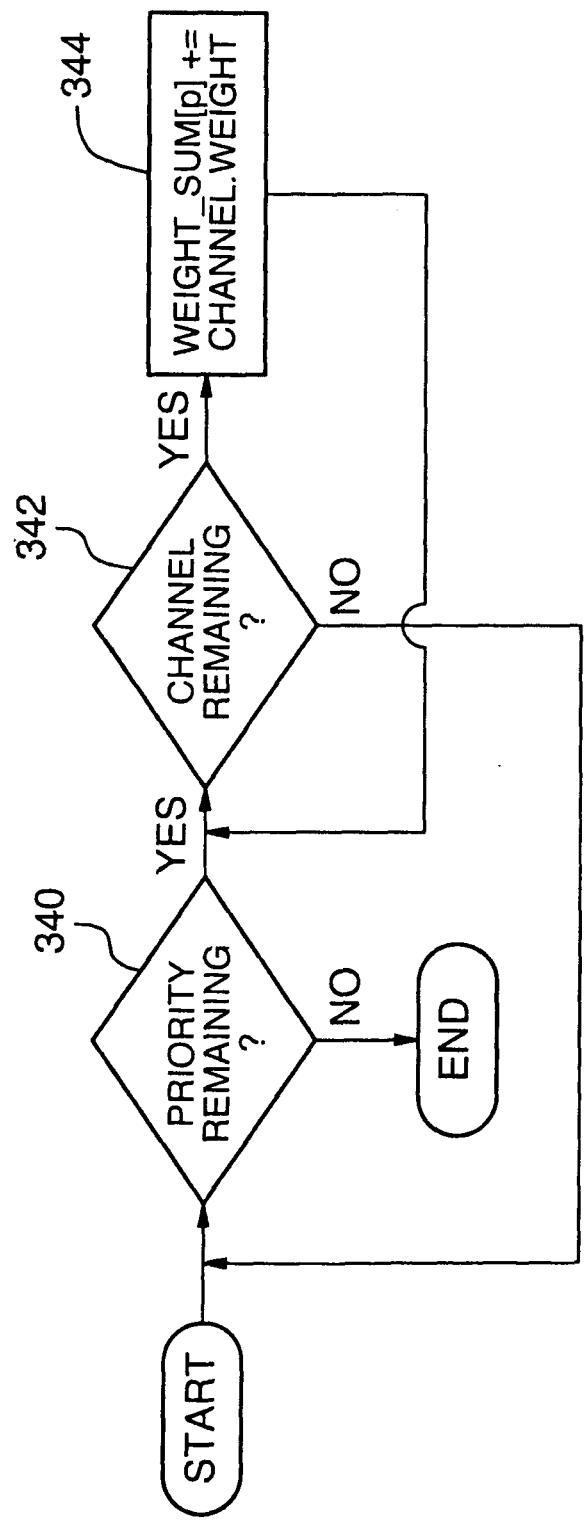

Processing then moves from step 158 to step 160 where the value of remaining[i] is set to shaper.rate. After step 160, processing returns to step 156. Once step 156 is completed, processing moves to step 161. At step 161, a weight calculation is made for each priority as shown in FIG. 13. At step 162 each priority is again examined as detailed in FIG. 9. In this iteration through the steps of FIG. 9 the shaper instances and priorities are examined to determine the values used to establish the contents of a command message.

Figure 10:
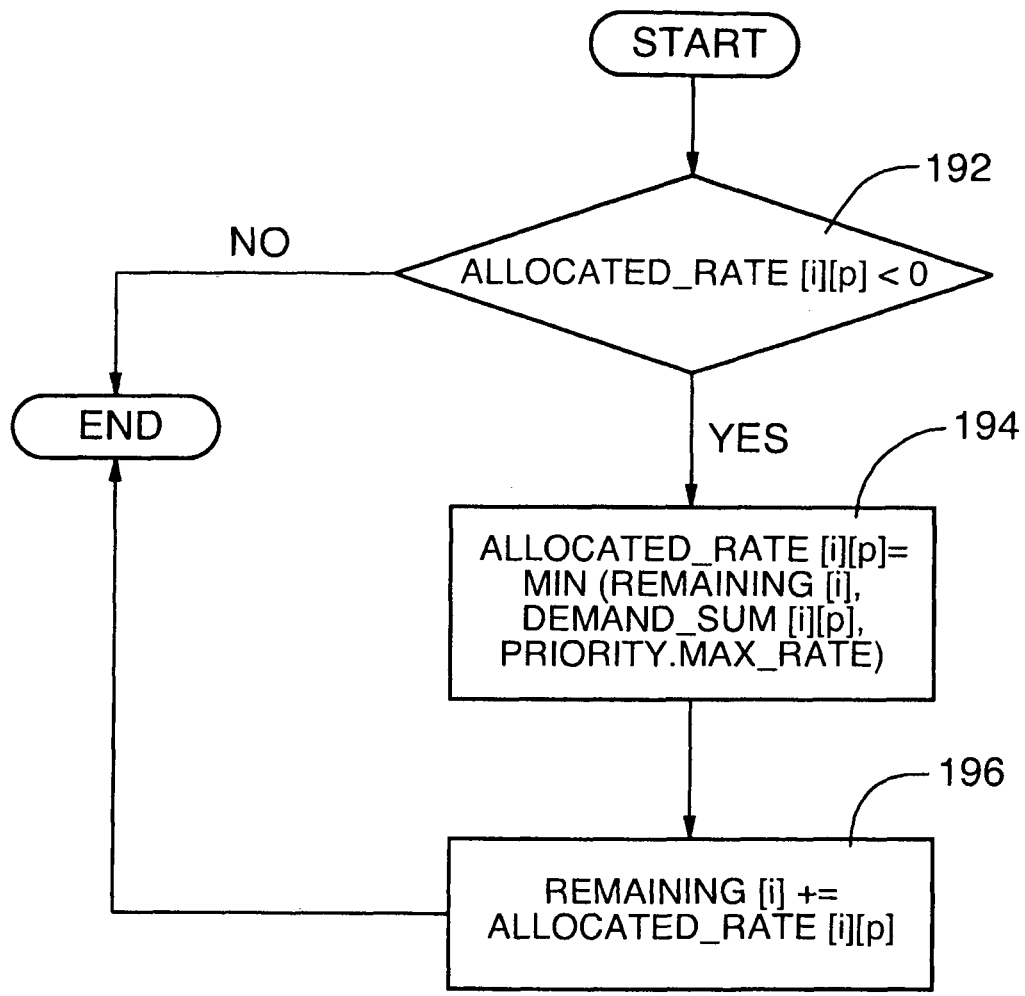

For each priority examined, processing moves to step 166. Once all priorities have been examined, processing returns to step 152. At step 166 the value of allocated_rate[i][p] is set as shown in FIG. 10. Processing then moves to step 168, where the priority rate is determined. Step 168 is detailed in FIG. 11.

Figure 12:
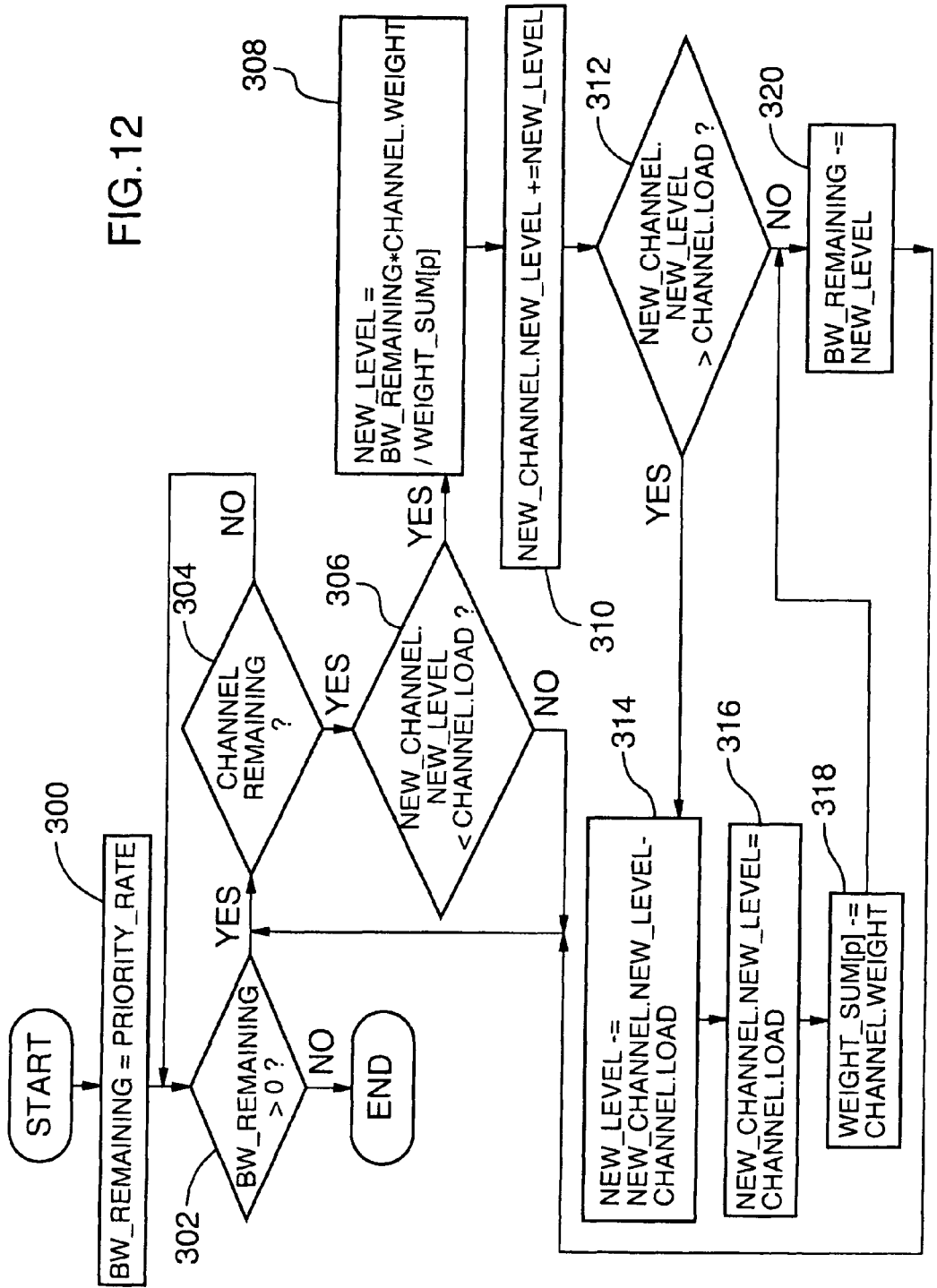

Upon completing step 168 processing moves to step 170 which is detailed in FIG. 12. Upon completion of step 170 processing moves to step 162.

Figure 9:
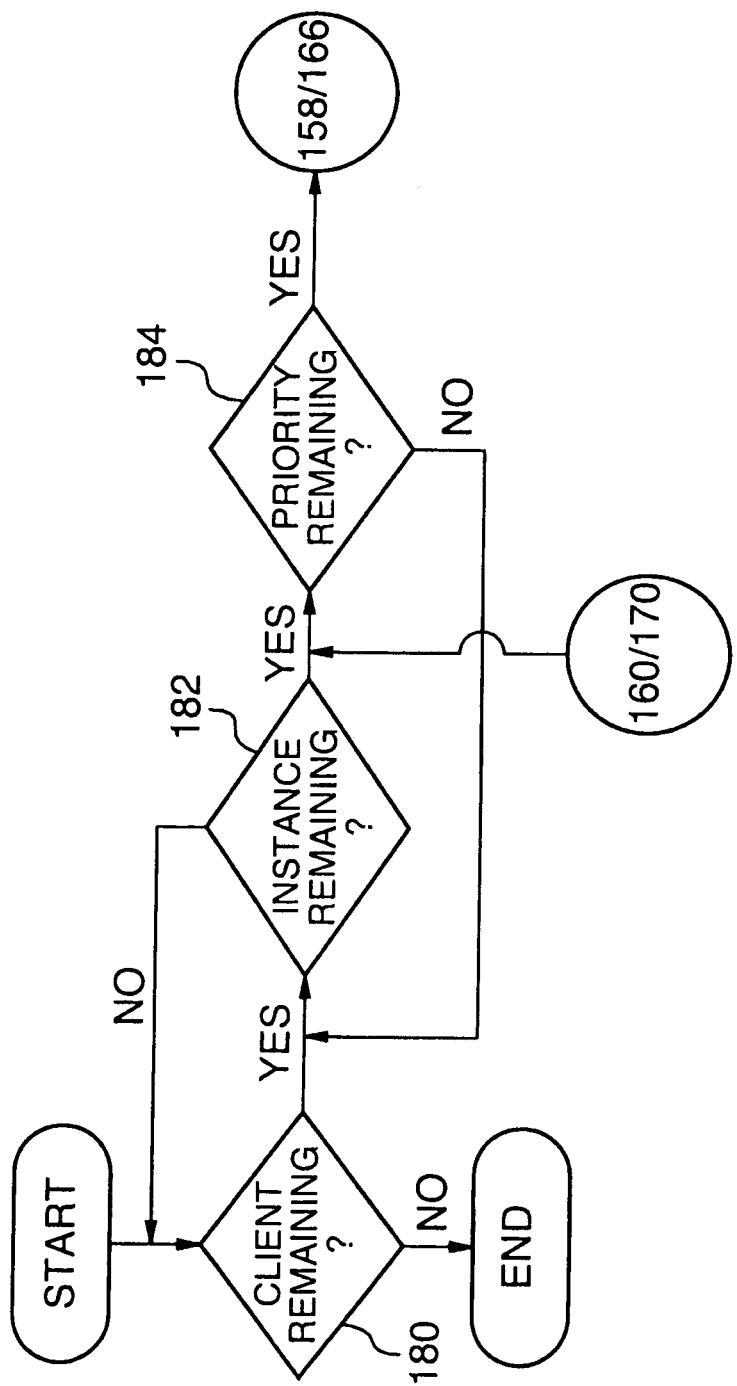

We refer now to FIG. 9, which relates to step 156 and 162 of FIG. 8. At step 180 a test is made to determine if clients remain to be examined. If the test is negative, processing ends. If the test is positive, processing proceeds to step 182 where a test is made to determine if a shaper instance remains to be examined. If not, processing returns to step 180. If a shaper instance remains, processing moves to step 184. At step 184 a test is made to determine if a priority needs to be examined. If so, processing continues with steps 158 (from step 156) or 166 (from step 162). If the test at step 184 results in the negative, processing returns to step 182. A link is also shown from steps 160 or 170 of FIG. 8 where it connects to feature 184. Note that FIG. 9 has the same logic as that for step 156 and step 162 of FIG. 8.

We refer now to FIG. 10, which relates to step 166 of FIG. 8. Step 166 determines how much traffic to give to a priority level, across all clients. Processing starts at step 192 where a test is made to determine if the allocated rate for each instance, priority pair is less than zero, i.e. whether it has been initialized or not. If it is non-negative (initialized), processing ends. If the rate is less than zero processing moves to step 194 where allocated_rate[i][p] is set to min(remaining[i], demand_sum[i][p], priority.max_rate). Processing then moves to step 196 where remaining[i] is reduced by the value of allocated_rate[i][p], after which processing ends.

Figure 11:
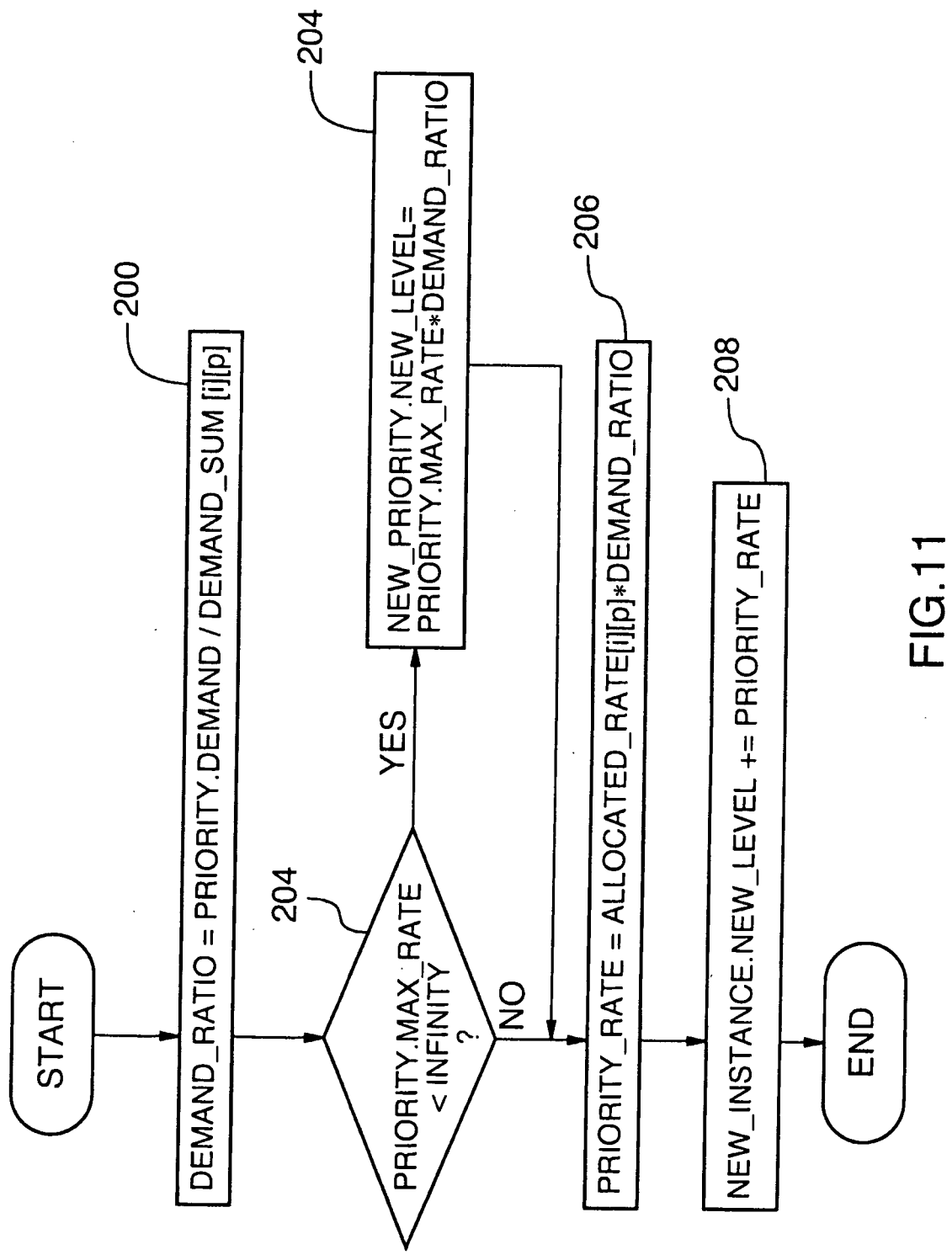

We refer now to FIG. 11, which relates to step 168 of FIG. 8. At this step the maximum rate for a priority on a client is calculated as a fraction of the total maximum rate for the priority, proportional to the demand for that priority on that client. At step 200, the value of demand_ratio is set. At step 202 a test is made to determine if prority.max_rate is less than infinity. If so processing moves to step 204 where the value of new_priority.new_level is set. Here and throughout the figures, the prefix "new_" refers to a command value, while the lack of it refers to a statistics value. If the test at step 202 is negative processing moves to step 206 where the priority_rate is set. Processing then moves to step 208 where new_instance.new_level is increased by the priority_rate. Processing then ends and starts again ate step 170 of FIG. 8.

We refer now to FIG. 12, which relates to step 170 of FIG. 8. In this step, credits are distributed to channels as necessary. Any credits assigned to a channel that exceed the credits requested by that channel are re-distributed to the other channels. Beginning at step 300 the value of bw_remaining is set to priority_rate. At step 302 a test is made to determine if the value of bw_remaining is greater than zero. If not, processing ends.

If the value of bw_remaining is positive, processing moves to step 304 where a test is made to determine if there is a channel remaining to examine, If not, processing returns to step 302. If a channel does remain to be examined, processing moves to step 306. At step 306 a test is made to determine if the value of new_channel.new_level is less than the value of channel.load. If the test at step 306 is positive, processing moves to step 308, where the value of new_level is set. If the test at step 306 is negative processing returns to step 304. Upon completion of step 308 processing moves to step 310 where the value of new_channel_new_level is increased by new_level. Processing then moves to step 312 where a test is made to determine if the value of new_channel.new_level>channel.load. If not processing moves to step 320. If the test at step 312 is positive processing moves to step 314 where the value of new_level is set. Processing then moves to step 316 where the value of new_channel.new_level is set. Processing then moves to step 318 where the value of weight_sum[p] is decreased by the channel.weight. Processing then continues at step 320, where the value of bw_remaining is decreased by the new_level and processing then returns to step 304.

We refer now to FIG. 13, which relates to step 161 of FIG. 8. At step 340 a test is made to determine if all priorities have been examined. If no priorities remain, processing ends. If priorities remain, processing moves to step 342 where a test is made to determine if all channels for a priority have been dealt with. If no, processing returns to step 340. If yes, processing moves to step 344 where a weight sum for the priority is updated. Processing then returns to step 342.

Other aspects and features of the present invention will become apparent to those ordinarily skilled in the art upon review of the following description of specific embodiments of the invention in conjunction with the accompanying figures.

Appendix A

```
shaper "all" 1Gbps
    priority "high"
        channel "voip" weight 5
        channel "games" weight 1
    priority "low"
        channel "web" weight 3
        channel "p2p" weight 2
if protocol "voip" then shape to
    shaper "all" priority "high" channel "voip"
    unique by (service_tier) shared by (subscriber)
... (more actions)
if protocol "http" then shape to
    shaper "all" priority "low" channel "web"
    unique by (service_tier) shared by (subscriber)
```

APPENDIX B

The following is pseudo-code for the application illustrated in the flowcharts of FIGS. 8 to 13.

```
foreach s in shapers; do //Figure 8
    shaper shaper = shapers[s];
    new_shaper new_shaper;
```

APPENDIX B-continued

The following is pseudo-code for the application illustrated in the flowcharts of FIGS. 8 to 13.

```
// sum of demand across all clients for one (instance, priority) pair.
int demand_sum[num_instances][num_priorities];
// as we go through the priorities, we allocate rates to each.
// rate_remaining is how much is left for future priorities.
// These just get initialized for now.
int rate_remaining[num_instances];
int allocated_rate[num_instances][num_priorities];
// first, initialize some values and sum up the demand across
// the clients
foreach c in shaper.clients; do //Figure 9
   client client = shaper.clients[c];
   foreach i in client.instances; do
      instance instance = client.instances[i];
      demand_sum[i][p] = 0;
      foreach p in instance.priorities; do
         priority priority = instance.priority[p];
         demand_sum[i][p] += priority.demand;
         allocated_rate[i][p] = -1; //uninitialized
         remaining[i] = shaper.rate;
      done
   done
done
// for each priority level, calculate the total weight of all channels
// in the priority. Each channel level calculates its own share as a
// ratio of its weight divided by this total. Figure 13
int weight_sum[num_priorities];
foreach p in shaper.priorities; do
   foreach ch in priority.channels; do
      channel channel = priority.channel[ch];
      weight_sum[p] += channel.weight;
   done
done
// then, go through each client and calculate the rates. Figure 9.
foreach c in shaper.clients; do
   client client = shaper.clients[c];
   new_client new_client;
   foreach i in client.instances; do
      instance instance = client.instances[i];
      new_instance new_instance;
      foreach p in instance.priorities;.do
        priority priority = instance.priority[p];
        new_priority new_priority;
        // Calculate how much
        // traffic to give to this priority level (across all
        // clients). This will then get distributed across
        // the clients. Figure 10
        if (allocated_rate[i][p] < 0); then
           allocated_rate[i][p] = min(
              remaining[i],
              demand_sum[i][p],
              priority.max_rate
           );
           remaining[i] -= allocated_rate[i][p];
        fi
        // calculate the max rate for this priority on this
        // client as a fraction of the total max rate,
        // proportional to its demand. Figure 11
        new_priority.new_level = infinity;
        float demand_ratio = priority.demand / demand_sum[i][p];
        if (policy_priority.max_rate < infinity); then
           new_priority.new_level = priority.max_rate * demand_ratio;
        fi
        // how much traffic we actually expect this
        // priority to send (either the max rate or a
        // fraction of the amount of traffic we have
        // allocated to it).
        int priority_rate = allocated_rate[i][p] * demand_ratio;
        new_instance.new_level += priority_rate;
        int bw_remaining = priority_rate;
        new_channel new_channels[num_channels];
        // We keep looping on this because there may be unused
        // bandwidth a the end of the first iteration that needs
        // to get re-distributed (because of capped channels).
        // This gets distributed to the other channels,
        // proportional to their load.
        // Doing this may make another channel overflow, in which
        // case we have to go through another iteration. Figure 12
        while (bw_remaining > 0); do
           foreach ch in priority.channels; do
              channel channel = priority.channel[ch];
              new_channel new_channel = new_channels[ch];
              if (new_channel.new_level < channel.load); then
                 int new_level = bw_remaining * channel.weight / weight_sum[p];
                 new_channel.new_level += new_level;
                 // a channel is not given more bandwidth than
                 // it needs, so if we ever assign it more
                 // than that, cap it at its input traffic.
                 if (new_channel.new_level > channel.load); then
                    new_level -= new_channel.new_level - channel.load;
                    new_channel.new_level = channel.load;
                    weight_sum[p] -=channel.weight;
                 fi
                 bw_remaining -= new_level;
              fi
           done
        done
        for ch in priority.channels; do
           new_priority.channels[ch] = new_channels[ch];
        done
        new_instance.priorities[p] = new_priority;
     done
     new_client.instances[i] = new_instance;
   done
   new_shaper.clients[c] = new_client;
done
new_shapers[s] = new_shaper;
done
```

We claim:

1. A system for monitoring and modifying the behavior of a plurality of distributed shapers, said system comprising:
   a server;
   said server in communication with a plurality of clients on a plurality of traffic processing devices, each client comprising at least a portion of a shaper of said plurality of distributed shapers, wherein said server is configured to receive statistics related to said datagram traffic from said clients and to retain the same; and
   said server is configured to utilize said statistics to send commands to said clients to modify the behavior of said plurality of distributed shapers, wherein the commands comprise at least two new parameters for the plurality of shapers selected from the group consisting of a new maximum rate, a new rate, and a new weight, and wherein the behavior of the plurality of distributed shapers is further modified based on at least one shaping scheme and the behavior of the plurality of distributed shapers is coordinated such that the plurality of distributed shapers collectively shape traffic to a desired rate.

2. The system of claim 1, wherein said commands instruct said clients to provide the new maximum rate for a priority related to at least one of said shapers.

3. The system of claim 1, wherein said commands instruct said clients to provide the new weight for a channel related to at least one of said shapers.

4. The system of claim 1, wherein said commands instruct said clients to assign a total rate to each of said at least a portion of a shaper of said plurality of distributed shapers.

5. The system of claim 1, wherein the statistics further calculate bandwidth remaining and if bandwidth is remaining the server adjusts the traffic flow to fill the remaining bandwidth.

6. The system of claim 1, wherein the at least one shaping scheme is a scheme selected from:
- cloned shaping;
- prioritized shaping;
- weighted fair queuing; and
- fair shaping.

7. A method for modifying the behavior of a plurality of distributed shapers in a network comprising a plurality of clients on a plurality of traffic processing devices, said method comprising:

for each shaper:
- determining a demand sum across all clients; and for at least one server in communication with the plurality of client:
- wherein the determining utilizes data provided by a statistics record related to datagram traffic; and
- generating a command record for modifying the behavior of each shaper of the plurality of distributed shapers based on the statistics record, wherein the command record is a message comprising at least two new parameters for the plurality of shapers selected from the group consisting of a new maximum rate, a new rate, and a new weight and wherein the behavior of the plurality of distributed shapers is further modified based on at least one shaping scheme and the behavior of the plurality of distributed shapers is coordinated such that the plurality of distributed shapers collectively shape traffic to a desired rate.

8. The method of claim 7 wherein said demand sum comprises the sum of demand across all clients for a shaper.

9. The method of claim 7 wherein said demand sum comprises the sum of the weights of all channels in a given priority.

10. The method of claim 7 wherein said rate for a priority comprises an allocated rate for an instance priority pair, divided by a demand ratio.

11. The method of claim 7, further comprising for each priority of a shaper instance, calculating bandwidth remaining.

12. The method of claim 7, wherein if the datagram traffic of one shaper is modified, the behavior of the remaining shapers in the plurality of distributed shapers will be modified to continue to collectively shape traffic to the desired rate.

13. The method of claim 12, wherein the desired rate is based on the load or demand placed on each shaper of the plurality of distributed shapers.

14. The method of claim 7, wherein the at least one shaping scheme is a scheme selected from:
- cloned shaping;
- prioritized shaping;
- weighted fair queuing; and
- fair shaping.

15. A system for monitoring and modifying the behavior of a plurality of distributed shapers, said system comprising:
- a server;
- the server in communication with a plurality of clients on a plurality of traffic processing devices, each client comprising at least a portion of a shaper of said plurality of distributed shapers;
- wherein said server is configured to receive statistics related to said datagram traffic and to retain the same; and
- said server is configured to utilize said statistics to send commands to said clients to modify the behavior of said plurality of distributed shapers, wherein the commands comprise at least two new parameters for the plurality of shapers selected from the group consisting of a new maximum rate, a new rate, and a new weight and wherein if there is a change in the datagram traffic, the server will send further commands to further modify the behavior of the plurality of distributed shapers such that the plurality of distributed shapers will continue to collectively shape traffic to a desired target rate.

16. The system of claim 15, wherein said commands instruct said clients to provide the new maximum rate for a priority related to at least one of said shapers.

17. The system of claim 15, wherein said commands instruct said clients to provide the new weight for a channel related to at least one of said shapers.

18. The system of claim 15, wherein said commands instruct said clients to assign a total rate to each of said at least a portion of a shaper of said plurality of distributed shapers.

* * * * *